C. F. GREEN.
WINDSHIELD CLEANER.
APPLICATION FILED JUNE 5, 1916.
1,397,511.
Patented Nov. 22, 1921.
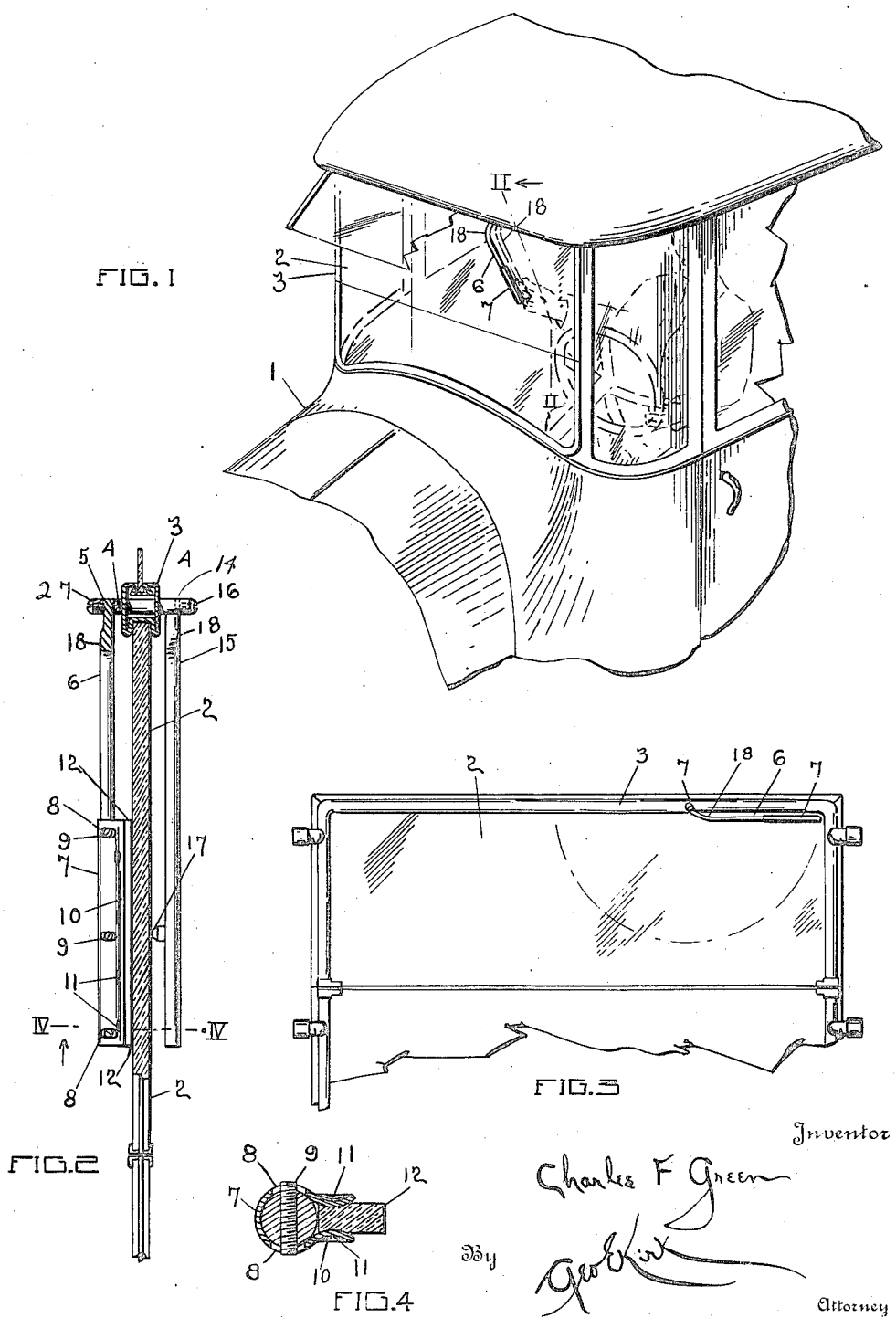

UNITED STATES PATENT OFFICE.

CHARLES F. GREEN, OF TOLEDO, OHIO, ASSIGNOR TO THE WILLYS-OVERLAND CO., OF TOLEDO, OHIO, A CORPORATION OF OHIO.

WINDSHIELD-CLEANER.

1,397,511.  Specification of Letters Patent.  Patented Nov. 22, 1921.

Application filed June 5, 1916. Serial No. 101,661.

*To all whom it may concern:*

Be it known that I, CHARLES F. GREEN, a citizen of the United States of America, residing at Toledo, Lucas county, Ohio, have invented new and useful Windshield-Cleaners, of which the following is a specification.

This invention relates to wipers, especially for transparencies.

This invention has utility when embodied in connection with motor vehicle storm or wind shields.

Referring to the drawings:

Figure 1 is a fragmentary perspective view of a motor vehicle disclosing an embodiment of the invention;

Fig. 2 is a section on the line II—II Fig. 1, showing the wiper in mounted position on the storm shield panel;

Fig. 3 is a front view of the panel with the wiper mounted thereon, and

Fig. 4 is a section on the line IV—IV Fig. 2.

The motor vehicle 1 has the windshield upper glass panel or transparency 2 mounted in the storm shield frame 3. This storm shield may have its vehicle closing efficiency unimpaired and be provided with the wiper herein disclosed by introducing the wiper shaft 4 through the frame 3 to project on each side thereof. In the outer side projection of the shaft 4 having opening 5 may be inserted the arm 6 and held in such position by the set screw 27. This arm 6 may have its free end embraced by the folded clip 7 having openings 8 therein loosely anchored by the pins 9 for some freedom of movement on the arm 6. The parallel extensions 10 of the clip 7 may have countersinks 11 therein for anchoring the wiper element proper or rubber 12 having its free edge disposed in parallel relation with the outer face of the transparency or glass panel 2.

The inner end of the shaft 4 has an opening similar to the opening 5 engaged by the arm 15 and held by the set screw 16. This arm 15 may serve as a director for the wiper arm 6 in holding such frame in contact with the opposite face of the panel 2 through the coaction of the buffer or leather block 17 near the free end of the arm 15 and opposite the wiper 12. The arms 6 and 15 have the similar offset portions 18 allowing the driver of the vehicle to swing the wiper into panel clearing position adjacent the frame 3 when out of use with the frictional coaction between the buffer 17 and the wiper 12 anchoring the device in this vision-clearing position.

For manipulation the free end of the arm 15 may be engaged and by swinging this arm on the pivot shaft 4 the wiper 12 rocks on the arm 6 and smoothes away and clears vision-obscuring accumulations on the outer face of the panel 2. A swing over and back will allow the wiper to rock at each limit of movement and the release in the position with the wiper adjacent the frame 3 has quickly and conveniently cleared the driver's vision portion of the panel for observation of the region forward.

This device is of simple construction, readily mounted for effective use in a closed car storm shield or front. The arms may be readily adjusted to panel thickness or for wear take up by merely bending the arm into the desired panel or pane coacting position. This bending is conveniently done by removing the arm or arms from the shaft 4.

What is claimed and it is desired to secure by United States Letters Patent is:

1. In a device of the class described, the combination of a wiper arm, a removable pin rigidly connected with said arm and extending laterally therefrom, and a wiper comprising a clip and yieldable member directly engaged and held by the clip, said clip being loosely mounted upon the arm and having a circumferential slot extending transversely of the arm for receiving said pin to permit a limited rotative movement of the clip upon the arm.

2. In a device of the class described, the combination of a wiper arm, a removable pin rigidly connected with said arm, a clip loosely mounted upon the arm and having a transversely extending slot of greater length than the diameter of the pin into which the latter projects, said clip comprising a single metallic strip and a wiper element disposed between and directly engaging the inner faces of the strip.

3. In a device of the class described, the combination of a wiper arm, a plurality of pins rigidly connected therewith, a single clip member loosely mounted upon said arm and having circumferential transversely arranged slots formed therein to receive said pins whereby a limited rocking movement of the clip upon the arm may be effected, and a wiper element clamped between the extremities of the clip, said clip having a plurality of depressed portions forced into the material of the wiper element to more securely retain the same.

In witness whereof I affix my signature.

CHARLES F. GREEN.